United States Patent
Ghosal et al.

(10) Patent No.: US 10,372,764 B2
(45) Date of Patent: Aug. 6, 2019

(54) EXTENDING DOCUMENT EDITORS TO ASSIMILATE DOCUMENTS RETURNED BY A SEARCH ENGINE

(71) Applicant: International Business Machines Corporation, Armonk, NY (US)

(72) Inventors: Sugata Ghosal, New Delhi (IN); Monika Gupta, New Delhi (IN); Debdoot Mukherjee, Kolkata (IN); Dinesh Raghu, Bangalore (IN); Vibha Singhal Sinha, New Delhi (IN); Vikram Tankasali, Bangalore (IN); Karthik Visweswariah, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1243 days.

(21) Appl. No.: 13/873,671

(22) Filed: Apr. 30, 2013

(65) Prior Publication Data
US 2014/0324806 A1 Oct. 30, 2014

(51) Int. Cl.
*G06F 16/00* (2019.01)
*G06F 16/951* (2019.01)
(Continued)

(52) U.S. Cl.
CPC .......... *G06F 16/951* (2019.01); *G06F 16/164* (2019.01); *G06F 16/168* (2019.01);
(Continued)

(58) Field of Classification Search
CPC ......... G06F 17/30867; G06F 17/30864; G06F 17/30882; G06F 17/30345;
(Continued)

(56) References Cited

U.S. PATENT DOCUMENTS

| 8,005,815 B2 | 8/2011 | Ellis | |
| 8,352,479 B2* | 1/2013 | Bedingfield, Sr. | ...... G06F 16/58 707/755 |

(Continued)

OTHER PUBLICATIONS

Lanfranchi, V., "Semantic Web-Based Document: Editing and Browsing in AktiveDoc," The Semantic Web: Research and Applications. Gomez-Perez, A. and Euzenat, J. (eds.), ESWC 2005, Heraklion, Crete, Greece, May 29-Jun. 1, 2005, 11 pages, Springer, Berlin/Heidelberg, Germany. Copy available at http://eprints.whiterose.ac.uk/3950/1/petrellid8.pdf as if Apr. 26, 2013.

(Continued)

*Primary Examiner* — Michelle N Owyang
(74) *Attorney, Agent, or Firm* — Ference & Associates LLC (57) ABSTRACT

Methods and arrangements for configuring document editors. A search client add-in is loaded at a document editor. At the document editor, a document is accepted from a search engine. Communication is established between the search client add-in and the search engine. At the search client add-in, supplementary information about the document is received from the search engine. User input about the document is accepted, and is directed to the search engine. The document is informatively enhanced via at least one of: the supplementary information and the user input. Other variants and embodiments are broadly contemplated herein.

13 Claims, 4 Drawing Sheets

(51) Int. Cl.
*G06F 16/23* (2019.01)
*G06F 16/245* (2019.01)
*G06F 16/16* (2019.01)
*G06F 16/953* (2019.01)
*G06F 16/903* (2019.01)
*G06F 16/901* (2019.01)

(52) U.S. Cl.
CPC ............ *G06F 16/23* (2019.01); *G06F 16/245* (2019.01); *G06F 16/901* (2019.01); *G06F 16/903* (2019.01); *G06F 16/953* (2019.01)

(58) Field of Classification Search
CPC ......... G06F 17/30477; G06F 17/30539; G06F 17/30011; G06F 17/3002; G06F 17/30654; G06F 17/30991; G06F 17/3053; G06F 17/3082; G06F 17/30964; G06F 16/951; G06F 16/9535; G06F 16/2455; G06F 16/3329; G06F 16/9574; G06F 16/24; G06F 16/3331; G06F 16/335; G06F 16/358; G06F 16/7867; G06F 16/9038
USPC .................................................. 707/705–780
See application file for complete search history.

(56) References Cited

U.S. PATENT DOCUMENTS

| | | | | |
|---|---|---|---|---|
| 8,661,031 B2* | 2/2014 | Chandra | ........... | G06F 17/30864 707/730 |
| 8,793,256 B2* | 7/2014 | McIntire | ................ | G06Q 30/02 707/741 |
| 2006/0294085 A1* | 12/2006 | Rose | .................... | G06F 16/9535 |
| 2007/0136276 A1* | 6/2007 | Vella | ................ | G06F 17/30867 |
| 2009/0106202 A1* | 4/2009 | Mizrahi | ........... | G06F 17/30887 |
| 2010/0030765 A1* | 2/2010 | Chi | ........................ | G06F 17/241 707/726 |
| 2010/0031190 A1* | 2/2010 | Hall | .................. | G06F 17/30991 715/806 |
| 2010/0115401 A1 | 5/2010 | Nordine et al. | | |
| 2010/0313113 A1* | 12/2010 | Chen | ................ | G06F 17/30241 715/230 |
| 2011/0113320 A1 | 5/2011 | Neff et al. | | |
| 2011/0173172 A1 | 7/2011 | Hong et al. | | |
| 2011/0178981 A1 | 7/2011 | Bowen et al. | | |
| 2011/0219011 A1* | 9/2011 | Carmel | .................... | G06F 17/30 707/749 |
| 2012/0109884 A1 | 5/2012 | Goldentouch | | |
| 2012/0284176 A1 | 11/2012 | Svendsen et al. | | |
| 2013/0124515 A1* | 5/2013 | Ghimire | ............ | G06F 17/30643 707/728 |

OTHER PUBLICATIONS

Sophora Deskclient User Guide, Nov. 29, 2012, 64 pages. Copy available at http://extranet.subshell.com/display/SOPHORA/Sophora+DeskClient+User+Guide#SophoraDeskClientUserGuide-Editor as of Apr. 22, 2013.

* cited by examiner

EXTENDING DOCUMENT EDITORS TO ASSIMILATE DOCUMENTS RETURNED BY A SEARCH ENGINE

BACKGROUND

Generally, a search experience can be greatly enhanced by easily navigating to desired information in a search results document, and by understanding a context of a match. Conventionally, search engines aim to summarize important snippets (or pieces of information) alongside search results, show marked-up regions in instant preview thumbnails, and provide other enhancements.

However, in an enterprise document retrieval setting, it becomes particularly difficult to view and digest search results in a web browser; the size of such documents alone (on the order of possibly hundreds of pages or more) inhibits easy browsing. Most enterprise work-product documents are lengthy, but individual knowledge workers, based on their role, may only require only a small section thereof to serve their information needs at a given point in time.

It is recognized that browsing in a document editor, not just a viewer, can be helpful, as users may often wish to edit a document to suit their needs. Document viewers for conventional formats simply do not provide a user with a meaningful level of user experience in this manner, especially for bulky, diverse enterprise documents. Often complications relating to formatting loss arise, and embedded documents cannot be viewed.

BRIEF SUMMARY

In summary, one aspect of the invention provides a method of configuring a document editor, said method comprising: utilizing at least one processor to execute computer code configured to perform the steps of: loading a search client add-in at a document editor; accepting, at the document editor, a document from a search engine; establishing communication between the search client add-in and the search engine; at the search client add-in, receiving supplementary information about the document from the search engine; accepting user input about the document and directing the user input to the search engine; and informatively enhancing the document via at least one of: the supplementary information and the user input.

Another aspect of the invention provides an apparatus for configuring a document editor, said apparatus comprising: at least one processor; and a computer readable storage medium having computer readable program code embodied therewith and executable by the at least one processor, the computer readable program code comprising: computer readable program code configured to load a search client add-in at a document editor; computer readable program code configured to accept, at the document editor, a document from a search engine; computer readable program code configured to establish communication between the search client add-in and the search engine; computer readable program code configured to receive, at the search client add-in, supplementary information about the document from the search engine; computer readable program code configured to accept user input about the document and directing the user input to the search engine; and computer readable program code configured to informatively enhance the document via at least one of: the supplementary information and the user input.

An additional aspect of the invention provides a computer program product for configuring a document editor, said computer program product comprising: a computer readable storage medium having computer readable program code embodied therewith, the computer readable program code comprising: computer readable program code configured to load a search client add-in at a document editor; computer readable program code configured to accept, at the document editor, a document from a search engine; computer readable program code configured to establish communication between the search client add-in and the search engine; computer readable program code configured to receive, at the search client add-in, supplementary information about the document from the search engine; computer readable program code configured to accept user input about the document and directing the user input to the search engine; and computer readable program code configured to informatively enhance the document via at least one of: the supplementary information and the user input.

A further aspect of the invention provides a method comprising: downloading a document; establishing a connection between the document and a server extension of a search engine, and thereupon designating a connection object; performing at least one of the following steps (a), (b) and (c): (a) requesting information from the server extension with relation to the connection object; (b) receiving user input to add, with respect to the document, at least one of: a tag, and a rating; and (c) receiving a user-initiated query upon the user selecting text in the document.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Broadly contemplated herein, in accordance with at least one embodiment of the invention, are methods and arrangements for rendering consumable search results to a client side, in contrast with a conventional arrangement in which static and unembellished information, merely to enhance a user's understanding in a passive manner, is placed alongside search results.

Among attendant advantages that may be found in accordance with at least one embodiment of the invention, a search framework does not need to store an actual document, in its native format, or a processed (or instrumented) copy of the same. Further, a richer user experience is available. For instance, as document content is assimilated, tagging, rating and searching for similar documents can be performed.

Broadly contemplated herein, in accordance with at least one embodiment of the invention, are methods and arrangements for creating an architectural extension to a search engine to permit a bi-directional information flow between document editors and the search engine. By way of example, several types of information could be very productive to a search-engine user if transferred from the search engine to the document editor. These include landmarks of a desired section in the document; particularly, based on a user's role, information-seeking pattern or cue terms in a query, the search engine can pinpoint one or more document sections which may be relevant to the user. Landmarks of match-snippets can also be transferred, wherein users can easily navigate (e.g., via previous/next buttons) through the snippets in the document that matched the user query (or an expanded form of the query). Also transferable is a user-friendly explanation of document scoring, which can help users understand matches, especially when the query is augmented with contextual cues.

In accordance with at least one embodiment of the invention, information transferred from the document editor to the search engine can include tags or ratings. Particularly, as the user assimilates information, he/she can rate or tag it effectively in a manner that is not attainable when quick browsing (in that, in such an instance, the user needs to carefully study or use a document or other content it in order to judge its usefulness). Also transferrable in a similar direction is a "query by example", wherein the user can select a region in the document and compose a "more like this" query.

Figure 1:
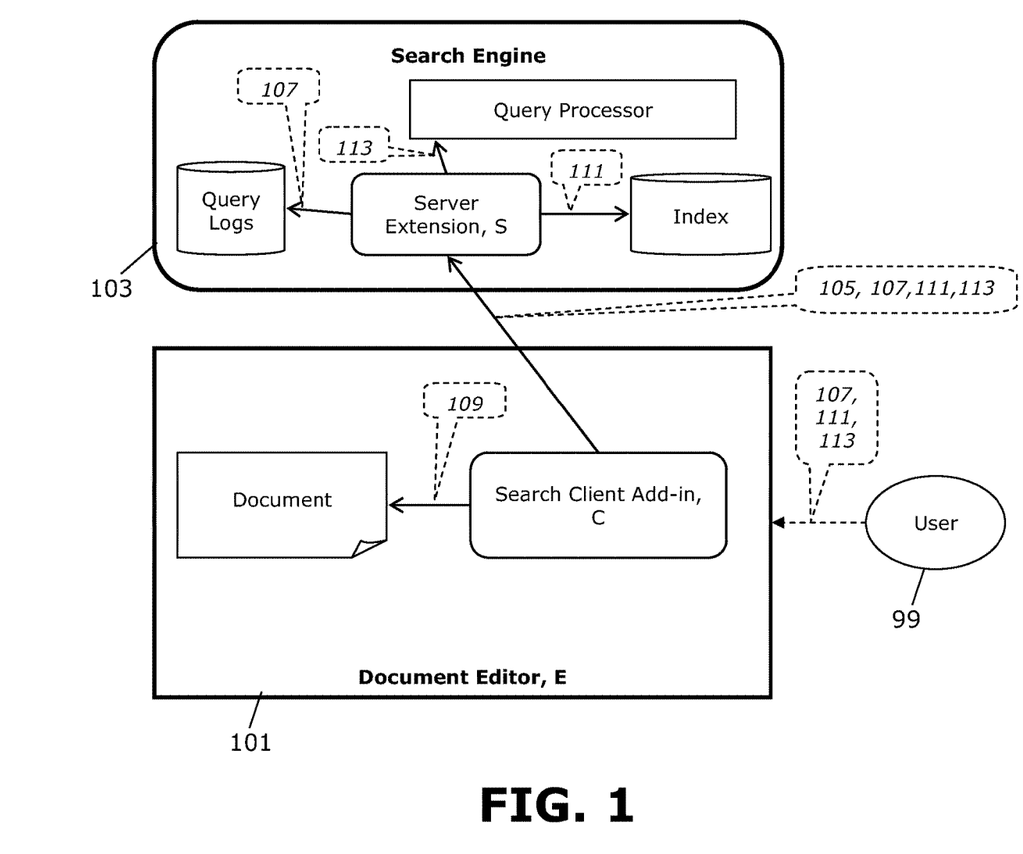
FIG. 1 schematically illustrates a general system architecture.

FIG. 1 schematically illustrates a general system architecture, in accordance with at least one embodiment of the invention. As shown, a user 99 interacts with a document editor E (101), which itself interacts with a search engine 103. Several steps 105-113 shown in FIG. 1 are referred to below.

In accordance with at least one embodiment of the invention, in step 105, when a search client add-in C is loaded in the context of a document, it sends a request to the search engine (or search server) to learn a most recent query-id for which the client's user has retrieved the document and the result-id for the opened document. The request, by way of example, may be sent to a server extension S. All further requests from the client to the server may be identified with the <query-id, result-id> token. In step 107, the client can, on-demand (e.g., in response to user clicks) obtain the following against a <query-id, result-id>: Desired section landmarks; Match-snippet landmarks; Query Explanation. (Here, "landmarks" refers to positions in documents, e.g., page number, line number and character number. Further, it should be noted that the information obtained here in step 107 is not available from user query logs, but is available as part of the search process.)

In accordance with at least one embodiment of the invention, in step 109, the client can then mark up the document based on the landmarks. In step 111, the client can then post tag/rate requests with result-id; this information is then registered in the search engine index. In step 113, the client can compose and send more-like-this queries to the search engine by extracting text from a document region selected by the user; these queries are sent to the query processor in the search engine.

Figure 2:
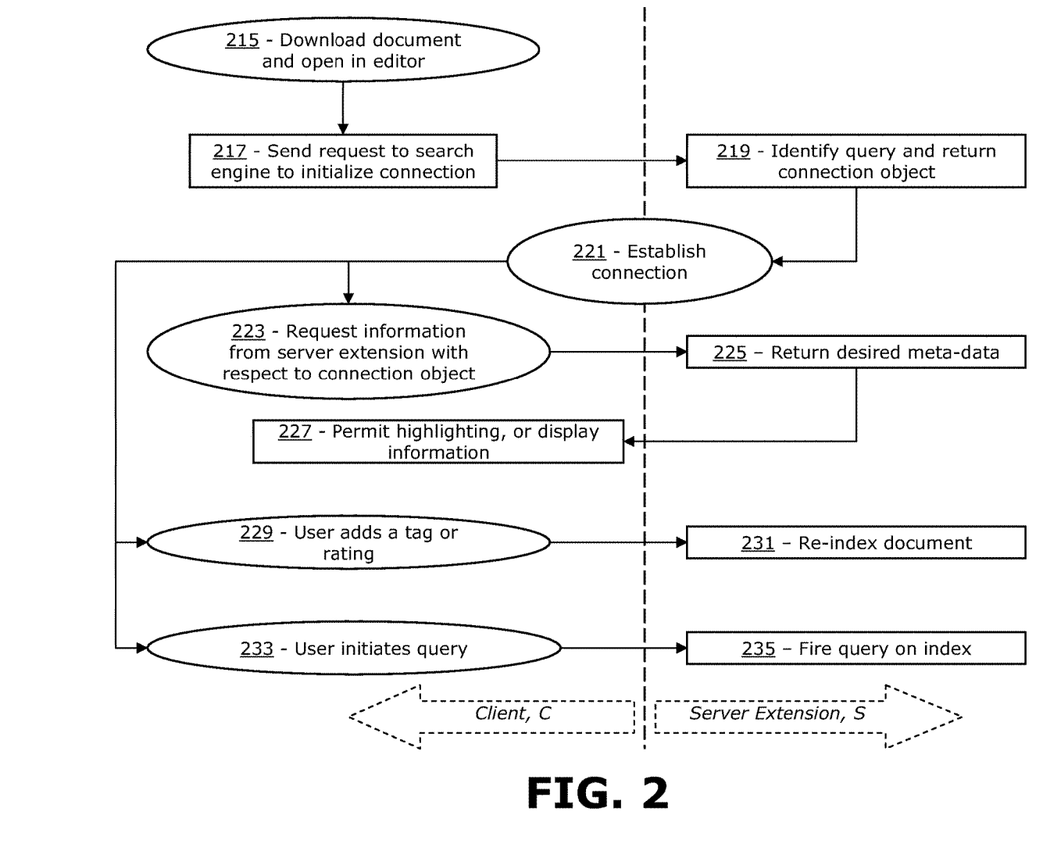
FIG. 2 schematically illustrates a method involving an extension of document editors.

FIG. 2 schematically illustrates a method involving an extension of document editors, in accordance with at least one embodiment of the invention. Particularly, FIG. 2 shows several details of steps that may be carried out in accordance with a system architecture such as that shown in FIG. 1. As such, in accordance with the method shown in FIG. 2, it is assumed that some steps already have been performed. Such steps include a user U having registered for an account with a search engine SE, via a server extension S. U can then be identified by S with the help, e.g., of a user-id and password. Optionally, SE may store additional information about U's role and/or preferences. Then, the user U installs the search client add-in C on a document editor E, wherein the user-id/password (or other identifying arrangement) for U on SE is configured and saved by C.

In accordance with at least one embodiment of the invention, several steps are then carried out between the client C and server extension S via interaction with or direction by user U. First (215), user U downloads a document D returned as a search result by Search Engine SE and opens it in editor E. Next (217), the client C in E sends a request to Server Extension S in SE to initialize a connection for D, with the following parameters: user-id/password of U; identifier(s) of D, e.g., filename, modified date, hashcode. Then (219), server extension SE identifies the latest query Q issued by user U which returned a result R referring to the document D. It returns a connection object, O that is composed of <Q.id, R.id>.

In accordance with at least one embodiment of the invention, in a next step (221), a connection is established for document D, and this connection is identified as connection object O. Then, several possible steps can take place at the client side. In accordance with one possibility (223), client C requests information from server extension S with respect to the connection object, O; this can aid the user's comprehension of D in relation to Q. Examples of information that can be requested are as follows: start and end markers for document region relevant to the user; start and end markers for text snippets matching the user's query; or an explanation of why D was considered as a match. At the server side, S then (225) fulfills the request by returning the desired meta-data about R corresponding to O, either by running Q corresponding to O again or from stored information in logs. At that point (227), the client C in E permits the highlighting of appropriate regions in D, or displays any information received from S.

By way of another possibility (229), in accordance with at least one embodiment of the invention, at the client side the user may add a tag or rating for document D. Then (231), at the server side, S invokes services to re-index document D (identified with R.id) with new tags and/or ratings. By way of yet another possibility (233), at the client side the user initiates a query Q' by selecting text in D. Then (235), at the server side, S fires Q' on its index, and fetches and displays results.

Figure 3:
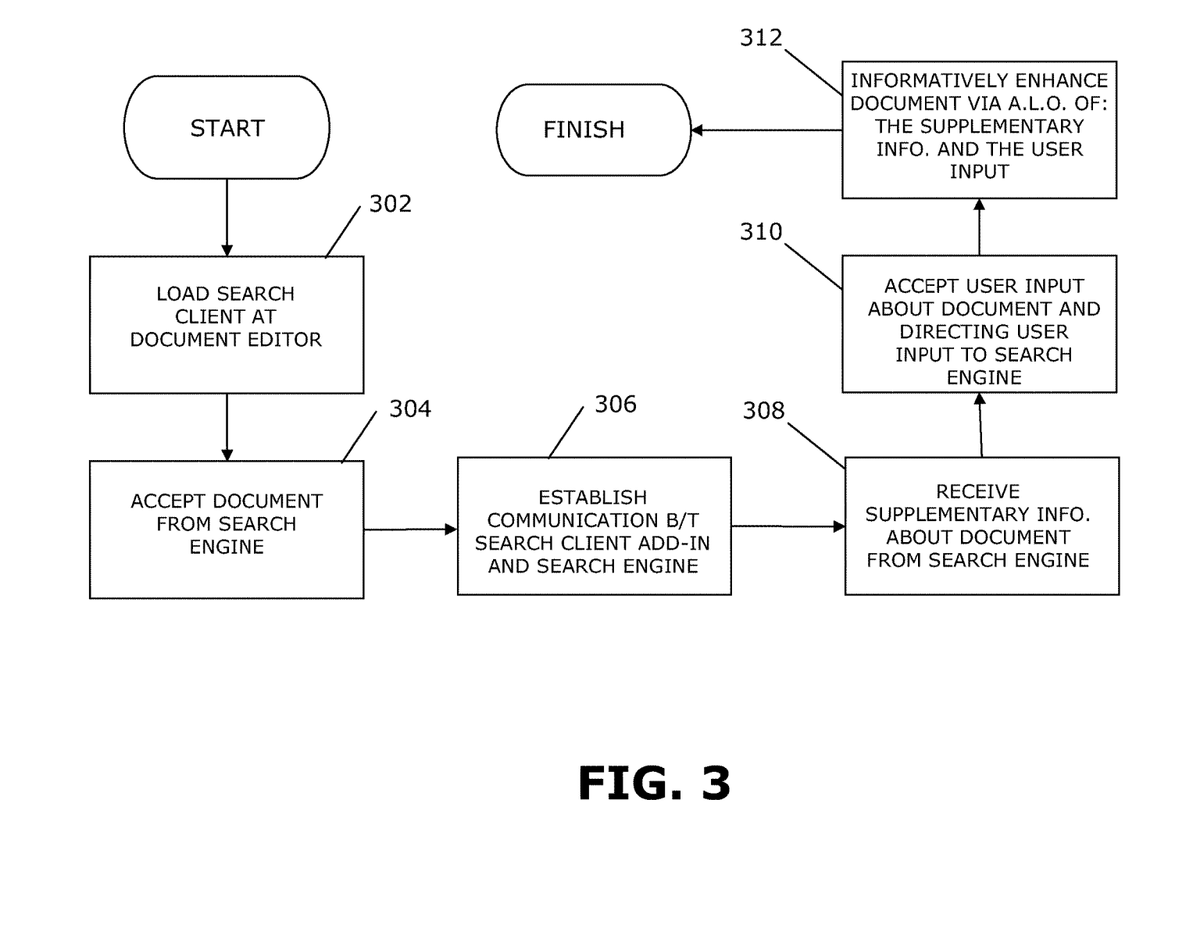
FIG. 3 sets forth a process more generally for configuring a document editor.

FIG. 3 sets forth a process more generally for configuring a document editor, in accordance with at least one embodiment of the invention. It should be appreciated that a process such as that broadly illustrated in FIG. 3 can be carried out on essentially any suitable computer system or set of computer systems, which may, by way of an illustrative and non-restrictive example, include a system such as that indicated at 12' in FIG. 4. In accordance with an example embodiment, most if not all of the process steps discussed with respect to FIG. 3 can be performed by way of a processing unit or units and system memory such as those indicated, respectively, at 16' and 28' in FIG. 4.

As shown in FIG. 3, in accordance with at least one embodiment of the invention, a search client add-in is loaded at a document editor (302). At the document editor, a document is accepted from a search engine (304). Communication is established between the search client add-in and the search engine (306). At the search client add-in, supplementary information about the document is received from the search engine (308). User input about the document is accepted, and is directed to the search engine (310). The document is informatively enhanced via at least one of: the supplementary information and the user input (312).

Figure 4:
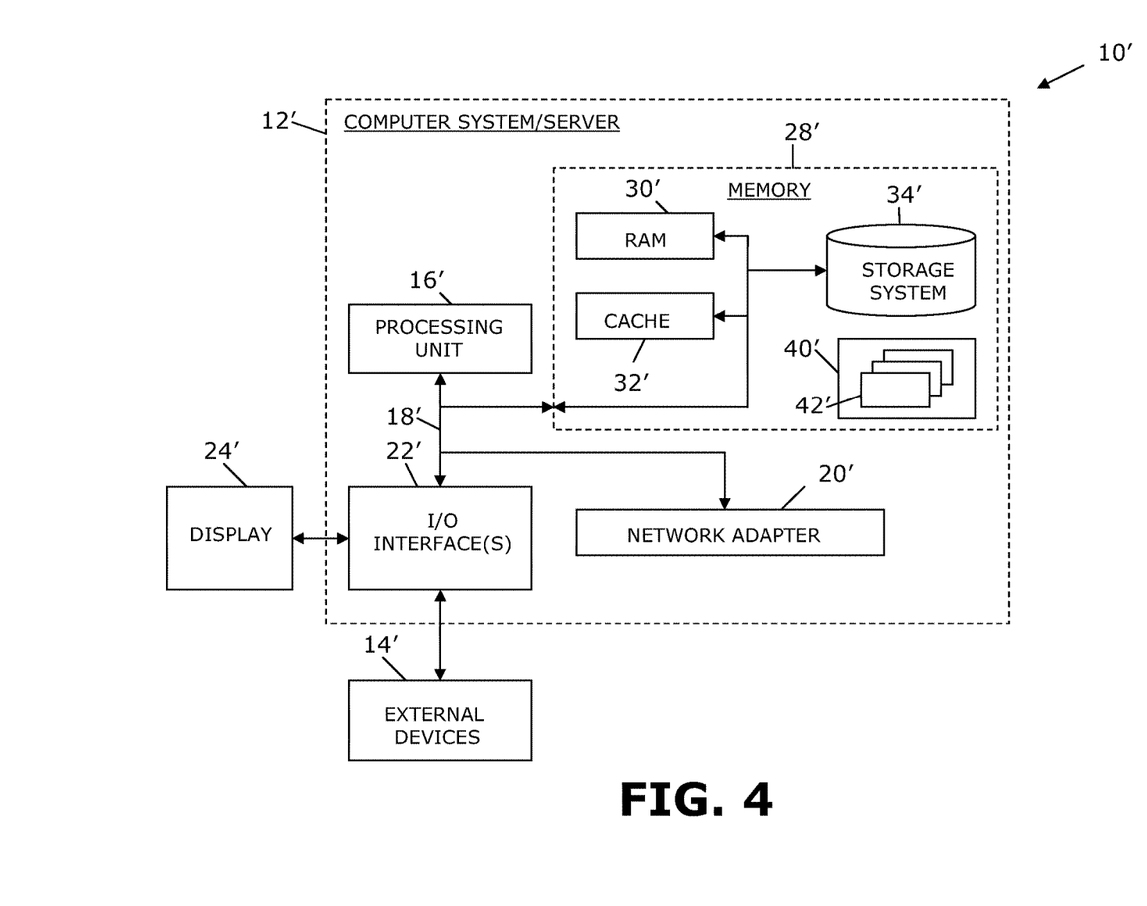
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of configuring a document editor, said method comprising:
    loading, using a processor, a search client add-in within a document editor, wherein the search client add-in facilitates communication between the document editor and a search engine;
    thereafter downloading and opening, in the document editor, a document returned as a search result from the search engine and selected by a user for download;
    sending, from the search client add-in to a server extension in the search engine, after opening the document, a request to initialize a connection for the document, wherein the request comprises identifiers of the document and credentials of the user;
    identifying, by the server extension and in response to the request to initialize a connection, a latest query issued by the user that returned a result referring to the document;
    returning, by the server extension, a query connection object for the user for the latest query of the user, wherein the query connection object comprises (i) a query identification identifying the latest query and (ii) a result identification identifying a result of the latest query;
    thereafter, establishing a connection for the document between a location in the document and the result of the query connection object and identifying the connection as a document connection object;
    after establishing the connection, and responsive to receiving, at the server extension, a request for information from the search client add-in, wherein the request is associated with the document connection object, (i) returning, from the server extension, meta-data about the result of the query connection object and (ii) highlighting, in the document editor, regions of the document corresponding to the meta-data;
    after establishing the connection, and responsive to receiving, at the server extension, a tag or rating for the document from the search client add-in, re-indexing, at the server extension, the document with the received tags or ratings; and
    after establishing the connection, and responsive to receiving, at the server extension, a second query comprising selected text within the document from the search client add-in, (i) firing, at the server extension, the second query and (ii) returning, from the server extension, results of the second query.

2. The method according to claim 1, wherein the regions of the document corresponding to the meta-data comprises at least one element selected from the group consisting of: a desired section landmark; a match-snippet landmark; and a query explanation.

3. The method according to claim 2, wherein the highlighting comprises a document mark-up relative to the at least one element selected from the group consisting of: a desired section landmark, a match-snippet landmark, and a query explanation.

4. The method according to claim 1, further comprising informatively enhancing a document, wherein the informatively enhancing comprises at least one of: permitting highlighting of at least one document region, and displaying the regions of the document corresponding to the meta-data.

5. The method according to claim 1, wherein the second query comprises a more-like-this query.

6. The method according to claim 5, comprising firing the more-like-this query on an index of the search engine.

7. An apparatus for configuring a document editor, said apparatus comprising:
    at least one processor; and
    a non-transitory computer readable storage medium having computer readable program code embodied therewith and executable by the at least one processor, the computer readable program code comprising:
    computer readable program code configured to load a search client add-in within a document editor, wherein the search client add-in facilitates communication between the document editor and a search engine;
    computer readable program code configured to, thereafter, download and open, in the document editor, a document returned as a search result from the search engine and selected by a user for download;
    computer readable program code configured to send, from the search client add-in to a server extension in the search engine, after opening the document, a request to initialize a connection for the document, wherein the request comprises identifiers of the document and credentials of the user;
    computer readable program code configured to identify, by the server extension and in response to the request to initialize a connection, a latest query issued by the user that returned a result referring to the document;
    computer readable program code configured to return, by the server extension, a query connection object for the user for the latest query of the user, wherein the query connection object comprises (i) a query identification identifying the latest query and (ii) a result identification identifying result of the latest query;
    computer readable program code configured to thereafter, establish a connection for the document between a location in the document and the result of the query connection object and identifying the connection as a document connection object;
    after establishing the connection, and responsive to receiving, at the server extension, a request for information from the search client add-in, wherein the request is associated with the document connection object, computer readable program code configured to (i) return, from the server extension, meta-data about the result of the query connection object and (ii) highlight, in the document editor, regions of the document corresponding to the meta-data;

after establishing the connection, and responsive to receiving, at the server extension, a tag or rating for the document from the search client add-in, computer readable program code configured to re-index, at the server extension, the document with the received tags or ratings; and after establishing the connection, and responsive to receiving, at the server extension, a second query comprising selected text within the document from the search client add-in computer readable program code configured to (i) fire, at the server extension, the second query and (ii) return, from the server extension, results of the second query.

8. A computer program product for configuring a document editor, said computer program product comprising:

a non-transitory computer readable storage medium having computer readable program code embodied therewith, the computer readable program code comprising:

computer readable program code configured to load a search client add-in within a document editor, wherein the search client add-in facilitates communication between the document editor and a search engine;

computer readable program code configured to, thereafter, download and open, in the document editor, a document returned as a search result from the search engine and selected by a user for download;

computer readable program code configured to send, from the search client add-in to a server extension in the search engine, after opening the document, a request to initialize a connection for the document, wherein the request comprises identifiers of the document and credentials of the user;

computer readable program code configured to identify, by the server extension and in response to the request to initialize a connection, a latest query issued by the user that returned a result referring to the document;

computer readable program code configured to return, by the server extension a query connection object for the user for the latest query of the user, wherein the query connection object comprises (i) a query identification identifying the latest query and (ii) a result identification identifying a result of the latest query;

computer readable program code configured to thereafter, establish a connection for the document between a location in the document and the result of the query connection object and identifying the connection as a document connection object;

after establishing the connection, and responsive to receiving, at the server extension, a request for information from the search client add-in, wherein the request is associated with the document connection object, computer readable program code configured to (i) return, from the server extension, meta-data about the result of the query connection object and (ii) highlight, in the document editor, regions of the document corresponding to the meta-data;

after establishing the connection, and responsive to receiving, at the server extension, a tag or rating for the document from the search client add-in, computer readable program code configured to re-index, at the server extension, the document with the received tags or ratings; and after establishing the connection, and responsive to receiving, at the server extension, a second query comprising selected text within the document from the search client add-in, computer readable program code configured to (i) fire, at the server extension, the second query and (ii) return, from the server extension, results of the second query.

9. The computer program product according to claim 8, wherein the regions of the document corresponding to the meta-data comprises at least one element selected from the group consisting of: a desired section landmark; a match-snippet landmark; and a query explanation.

10. The computer program product according to claim 9, wherein the highlighting comprises a document mark-up relative to the at least one element selected from the group consisting of: a desired section landmark, a match-snippet landmark, and a query explanation.

11. The computer program product according to claim 8, wherein said computer readable program code is configured to perform at least one of: permitting highlighting of at least one document region, and displaying the regions of the document corresponding to the meta-data.

12. The computer program product according to claim 8, wherein the query comprises a more-like-this query.

13. The computer program product according to claim 12, wherein said computer readable program code is configured to fire the more-like-this query on an index of the search engine.

* * * * *